United States Patent [19]
Foley et al.

[11] 3,885,546
[45] May 27, 1975

[54] VALVE STEM SEAL AND LUBRICATOR

[75] Inventors: Thomas J. Foley, Southfield; Arthur E. Witzke, Northville, both of Mich.

[73] Assignee: Ford Motor Company, Dearborn, Mich.

[22] Filed: Nov. 5, 1973

[21] Appl. No.: 413,138

[52] U.S. Cl. ... 123/188 P; 123/90.37; 123/188 GC; 184/6.9; 277/32
[51] Int. Cl. .............................................. F01l 3/00
[58] Field of Search ... 184/6.9; 123/188 P, 188 GC, 123/90.37; 277/32, 187, 189, 186, 193, 199, 195, 198

[56] References Cited
UNITED STATES PATENTS

| | | | |
|---|---|---|---|
| 1,481,562 | 1/1924 | Rowe | 123/188 P |
| 2,157,867 | 5/1939 | Robertson | 123/188 P |
| 3,377,074 | 4/1968 | Cundy | 277/32 |
| 3,554,180 | 1/1971 | Lesser | 123/188 |
| 3,788,295 | 1/1974 | Toth | 123/188 P |

Primary Examiner—Manuel A. Antonakas
Assistant Examiner—Daniel J. O'Connor
Attorney, Agent, or Firm—Roger E. Erickson; Keith L. Zerschling

[57] ABSTRACT

A valve stem oil seal and lubricator for an internal combustion engine intake or exhaust valve including a porous annular member having an elastomeric segment. The annular member is fixed in position relative to the valve guide bore. The elastomeric segment is bonded to the porous material and is in tension when the annular member is installed about the valve stem.

15 Claims, 7 Drawing Figures

VALVE STEM SEAL AND LUBRICATOR

BACKGROUND AND SUMMARY OF THE INVENTION

Lubrication is often provided to the valves of a typical internal combustion engine by means of a spray within the valve cover or gravity flow from their respective rocker arms. Oil applied to and adjacent the upper, free end of the valve stem flows along the stem toward the valve head. A tolerance between the valve stem and the valve guide bore permits the passage of oil from the upper end of the valve stem toward the valve head. Excessive oil flow along the valve stem through the valve guide bore enters the combustion chamber, is burned and causes poor oil economy and increased exhaust emissions. Too little oil between the valve stem and the guide bore may cause valve sticking, burning or excessive wear resulting in reduced engine service.

This invention provides a combination oil seal and lubricator which regulates or meters the flow of oil reaching the valve guide bore along the valve stem. The invention also provides an oil seal and lubricator which inherently accommodates for wear between itself and the valve stem thus maintaining more consistent oil control throughout the life of the engine. This invention further provides an oil seal and lubricating assembly having a simple two or three element construction which is reliable in operation, economical to produce and easy to install or replace. Furthermore, this invention provides a combination oil seal and lubricator which may be adapted to a typical present day internal combustion engine without the necessity of extensive modification to the engine structure.

An oil seal and lubricator assembly constructed in accordance with this invention comprises an annular member fixed relative to the valve guide and positioned about the valve stem. The annular member includes porous material which regulates the oil flow and elastomeric material. The elastomeric material is bonded to and interposes portions of the porous material. The elastomeric material is under tension when the annular member is installed about the valve stem.

DETAILED DESCRIPTION OF THE PREFERRED EMBODIMENTS

Figure 1:
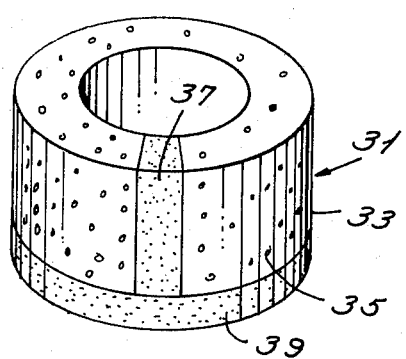
FIG. 1 is a perspective view of one embodiment of the invention.
Figure 2:
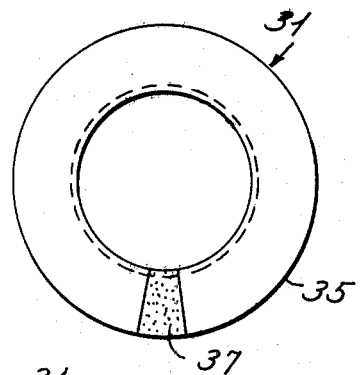
FIG. 2 is a top view corresponding to FIG. 1.
Figure 3:
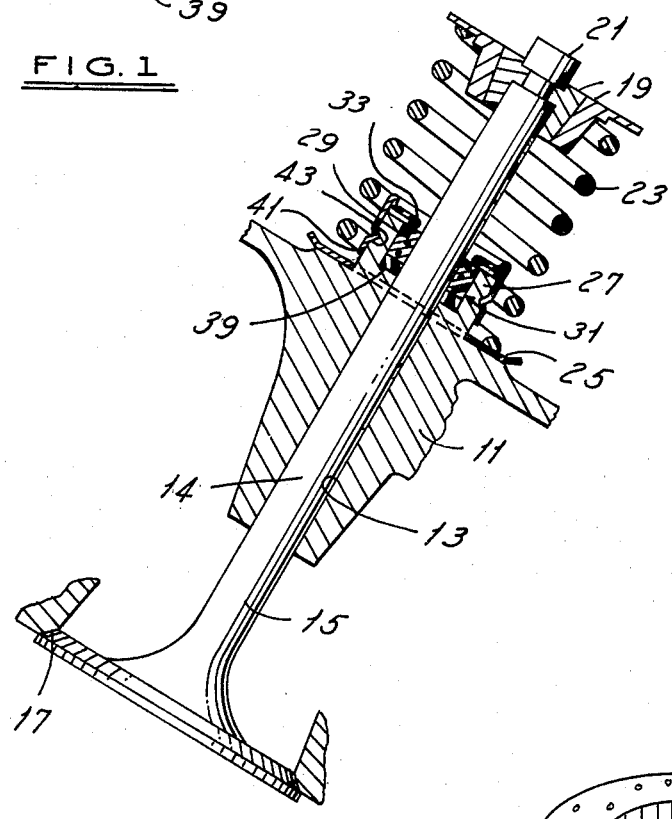
FIG. 3 is a cross sectional view of the first embodiment including the environment in which it operates.

In the embodiment illustrated by FIGS. 1 through 3, reference numeral 11 refers to the valve guide portion of an internal combustion engine cylinder head. The valve guide includes a bore 13 which slidably receives the stem 14 of an intake or exhaust valve 15, which is reciprocable to open and close a port 17 formed in the cylinder head. A spring retainer 19 is secured adjacent the upper end 21 of the valve stem and confines a compression spring 23 between it and a portion 25 of the cylinder head surrounding a valve guide boss 27.

The valve guide boss 27 is a cylindrical protrusion from the normal surface of the cylinder head and is coaxial with the valve guide bore 13. A cylindrical recess 29 is formed in the boss also coaxial with the bore 13. Received within the cylindrical recess is a combination valve stem seal and lubricator assembly 31. The assembly includes an annular member 33 comprising principally a porous material 35 such as sintered or other powdered metals but having a segment 37 of elastomeric material bonded between two portions of porous material. The inside diameter of the annular member 33 is slightly undersize relative to the diameter of the valve stem 14 so that when the annular member is positioned about the valve stem the elastomeric segment 37 is placed in tension. Sandwiched between the annular member and the base of the cylindrical recess 29 is an elastomeric or resilient washer 39. The inner diameter of the washer 39 is slightly larger than the outer diameter of the valve stem 14 to provide a clearance for the coil from the porous material 35 to travel past the washer and into the valve guide bore. The purpose of the washer is to prevent oil from passing about the outer diameter of the washer member and radially inwardly along the base of the annular cylindrical recess to the valve stem. A carefully controlled and regulated amount of oil can be provided by the porous material through the clearance between the valve stem and the inner diameter of the washer. An annular retainer 41 engages the top of the annular member 33 and includes a radially inwardly extending section 43 which snaps into a circular groove in the outer diameter of the valve guide boss 27.

Figure 4:
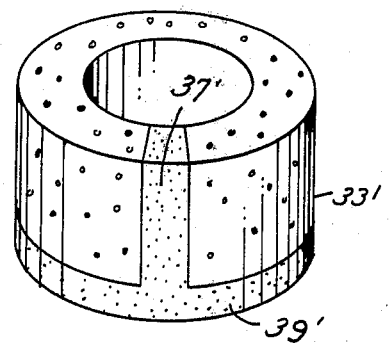
FIG. 4 is a perspective view of first modification of the invention.

FIG. 4 of the drawings illustrates a modification in that the elastomeric segment 37' of the annular member 33' is integrally formed with the washer 39'. Except for this distinction the seal and lubricator assembly of FIG. 4 is identical with that of FIGS. 1–3.

Figure 5:
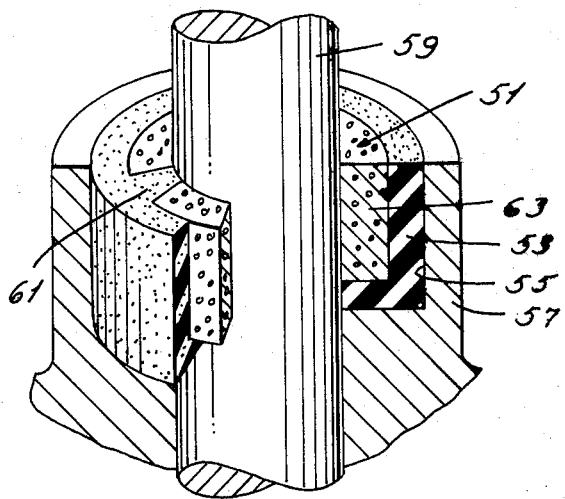
FIG. 5 is a perspective view with a section removed of a second embodiment of the invention.

Another modification of the invention is illustrated by FIG. 5 of the drawings in which an annular member 51 is received within an elastomeric cup 53 which, in turn, is received within the cylindrical recess 55 of the valve guide boss 57. In this embodiment, the inner diameter of the annular member 51 is slightly undersize that of the valve stem 59 similarly to the previously described embodiments so its elastomeric segment 61 is stretched or under tension between two portions of the porous material 63 when the valve seal and lubricator assembly is positioned about the valve stem. Also, the side walls of the cup 53 may be so designed that they provide a small radially inwardly directed compression force to the annular member further assuring a continued close fit between the inner diameter of the annular member and the valve stem. The cup 53 may be a separate elastomeric element from segment 61 of the annular member or it may be integrally formed.

Figure 6:
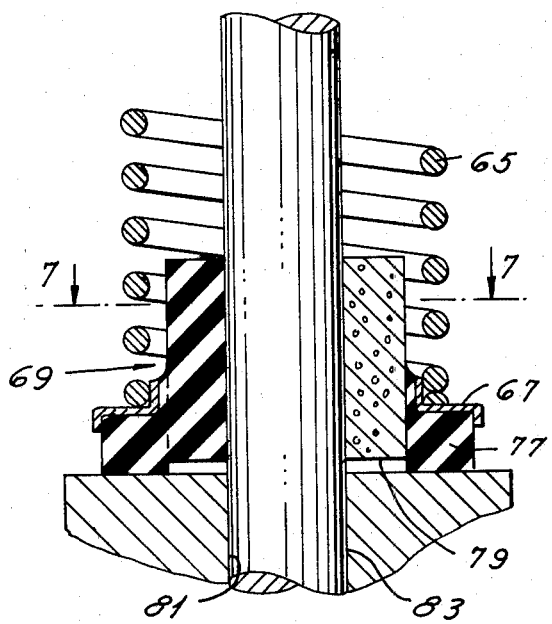
FIG. 6 is a cross sectional view of a third embodiment of the invention.
Figure 7:
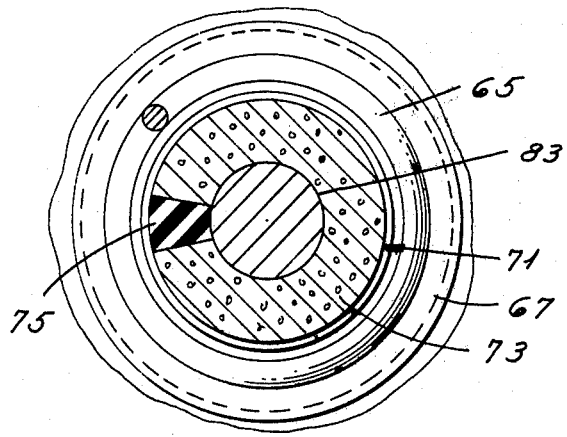
FIG. 7 is a section taken along line 7—7 of FIG. 6.

Another embodiment of the invention is illustrated by FIGS. 6 and 7. This embodiment is for use with a cylinder head not having valve guide bosses. The valve spring or an auxiliary spring 65 presses against an annular cover 67 which is positioned over and about a portion of the valve stem seal and lubricator assembly 69. The assembly includes an annular member 71 comprising primarily a porous, sintered material 73 and a segment 75 of elastomeric material under tension. Extending radially outwardly from the lower portion of the annular member is an elastomeric flange or shoulder 77. The flange is bonded or otherwise secured to the annular member 71 and spaces the base 79 of the annular member from the surface of the cylinder head about the valve guide bore 81. The flange functions as a seal to prevent oil from entering the lower valve stem surface 83 except through the porous material 73. The flange 77 may be bonded as a separate element to the annular member 71 as stated above or it may be integrally formed with the elastomeric segment 75 and bonded to porous material 73.

In each of the previously described embodiments, oil flow along the valve stem into valve guide bore is prevented except for a carefully controlled amount transmitted through a selected porous material, preferably sintered metal. Also, in each of these embodiments the sintered material has an annular shape but for a segment of elastomeric material which compeltes the annulus. When positioned about the valve stem, the elastomeric segment is placed under tension. A tight fit of the sintered material about the valve stem is thus assured even though a degree of wear between the sintered material and the valve stem may occur.

Modifications and alterations will occur to those skilled in the art which are included within the scope of the following claims.

We claim:

1. A combination seal and lubricator means, a fixed member and a cylindrical member reciprocable relative to and protruding from the fixed member,
said seal and lubricator means comprising
an annular member secured to the fixed member and positioned about the cylindrical member, said annular member engaging the circumference of said cylindrical member,
said annular member comprising porous material and elastomeric material, said elastomeric material interposing portions of said porous material, said elastomeric material being under tension when installed about the cylindrical member.

2. In an internal combustion engine valve stem seal and lubricator, a valve guide and a valve stem axially reciprocable relative to the valve guide,
said seal and lubricator comprising
an annular member fixed relative to the valve guide and positioned about the valve stem, said annular member engaging the circumference of said cylindrical member,
said annular member comprising porous material and elastomeric material, said elastomeric material interposing portions of said porous material, said elastomeric material being under tension when installed about the valve stem.

3. The combination of claim 2,
said annular member being primarily porous material and including a sector of elastomeric material.

4. The combination of claim 2,
the interior diameter of said annular member being less than the diameter of said valve stem when said annular member is in an uninstalled free state.

5. The combination of claim 2,
said porous material comprising sintered metal.

6. The combination of claim 2,
said valve guide comprising a boss positioned about a portion of said valve stem,
a cylindrical bore formed in said boss about said valve stem,
an elastomeric seal received in said recess and engaging the base of said bore,
said seal being positioned between said annular member and the base of said bore.

7. The combination of claim 6,
fastening means retaining said annular member within said bore.

8. The combination of claim 6,
said annular member comprising primarily porous material and including a segment of elastomeric material,
said segment and said seal being integral.

9. The combination of claim 2,
said valve guide comprising a boss positioned about a portion of said valve stem,
a cylindrical bore formed in said boss about said valve stem,
an elastomeric cup received within said bore engaging the side wall and base of said bore,
said annular member being received within said cup.

10. The combination of claim 9,
fastening means retaining said annular member within said bore.

11. The combination of claim 9,
said annular member comprising primarily porous material and including a segment of elastomeric material,
said segment and said cup being integrally formed.

12. The combination of claim 9,
an opening formed in the base of said cup receiving said valve stem, said opening spaced from said valve stem to not prevent regulated oil flow through said porous material along said valve stem.

13. The combination of claim 2,
said internal combustion engine including a spring positioned around said valve stem,
an elastomeric flange disposed about and secured to said annular member,
the base of said spring engaging said flange to essentially fix the position of said flange and annular member relative to said valve guide.

14. The combination of claim 13,
said annular member comprising primarily porous material and including a segment of elastomeric material,
said segment and said flange being integrally formed.

15. The combination of claim 14,
said flange secured to said annular member so that the base of said annular member is spaced the surface about said valve guide, said flange sealingly engaging the surface about said valve guide.

* * * * *